June 4, 1957  C. W. VOGT  2,794,405
DEPOSITOR MECHANISM FOR PLASTIC UNIT FORMING DEVICE
Filed Nov. 19, 1951  2 Sheets-Sheet 1

INVENTOR.
CLARENCE W. VOGT,
BY
his ATTORNEYS

June 4, 1957    C. W. VOGT    2,794,405
DEPOSITOR MECHANISM FOR PLASTIC UNIT FORMING DEVICE
Filed Nov. 19, 1951    2 Sheets-Sheet 2

INVENTOR.
CLARENCE W. VOGT,
BY
Campbell, Brumbaugh, Free & Graves
his ATTORNEYS

_United States Patent Office_

2,794,405
Patented June 4, 1957

2,794,405
DEPOSITOR MECHANISM FOR PLASTIC UNIT FORMING DEVICE

Clarence W. Vogt, Norwalk, Conn.

Application November 19, 1951, Serial No. 257,034

9 Claims. (Cl. 107—21)

The present invention relates to apparatus by means of which plastic or tacky substances may be removed from forming mechanism after such mechanism has formed the substance into desired shapes.

Substances such as butter, margarine, lard, caramels, and the like have a tackiness such that it is difficult to separate them from a surface upon which they rest. In forming prints of butter, for example, by mechanism which molds it into the desired shape in a molding cavity and then, by means of a piston or the like, ejects the formed print from the cavity, the substance tends to adhere to the face of the piston. To overcome this difficulty and to facilitate the separation of the substance from the aforesaid surface in order that the product may proceed through suitable wrapping operations, the present invention has been conceived.

Yet another object of the invention is to provide an apparatus of the above character which accomplishes the foregoing operation without disturbing the formed shape of the product.

Other objects and advantages of the invention will appear as it is described in detail in connection with the accompanying drawings, wherein.

Figure 1:
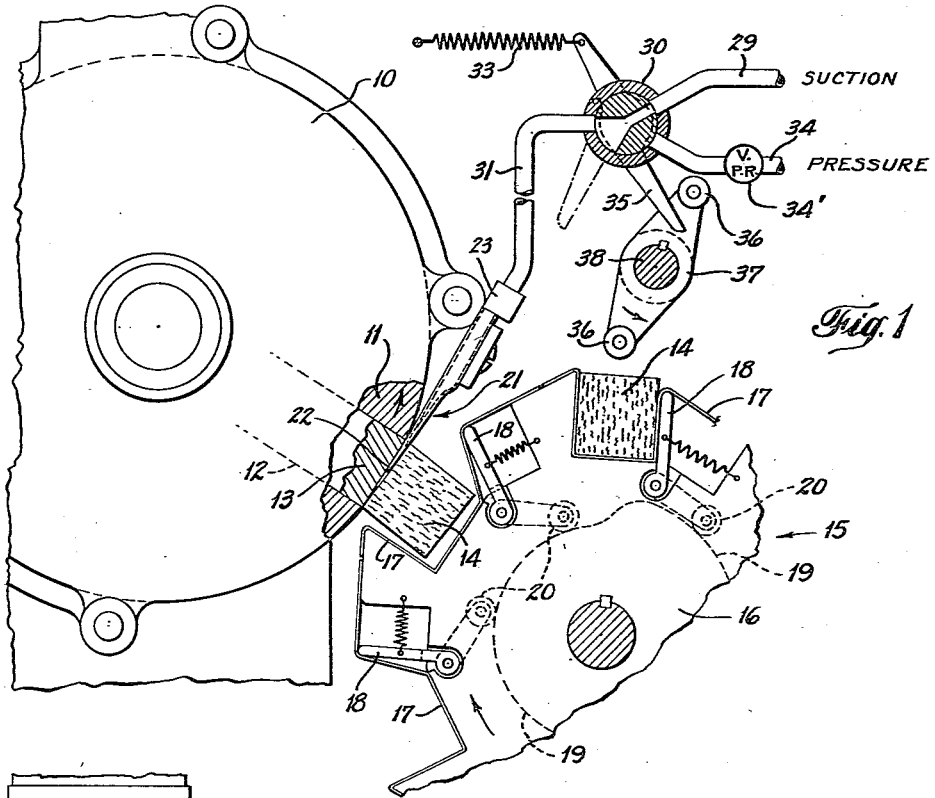
Figure 1 is a view in side elevation, partly broken away and in section, showing a device constructed in accordance with this invention.
Figure 2:
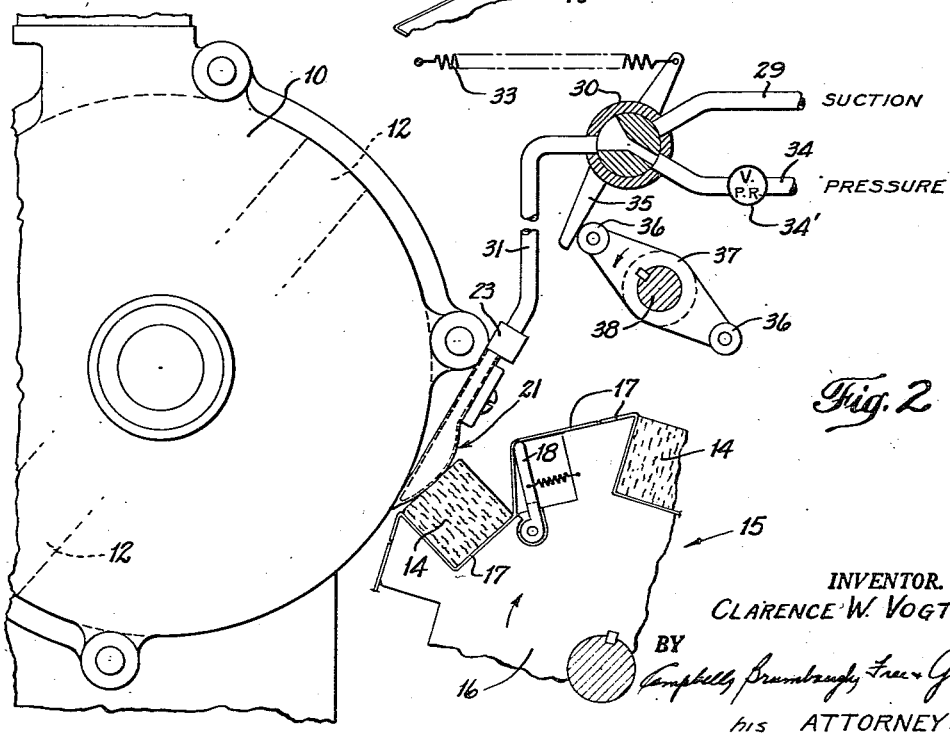
Figure 2 is a view similar to Figure 1, but showing the separating mechanism as it is actuated to separate the product from the forming mechanism and cause it to be seated properly in the wrapping mechanism.

Referring to the form of mechanism shown in Figures 1 to 4, a housing is shown at 10, being formed with a body and end plates and a cylindrical chamber within which a rotor 11 is received. The rotor is formed with one or more forming or molding chambers 12 within which pistons 13 are slidably received. Suitable actuating mechanism is provided for the pistons but, since these elements form no part of this invention, they need not be described in detail herein. It is sufficient to state that, in operation, the plastic substance is forced or drawn into the molding chamber 12 during which time the piston moves inwardly and toward the axis of the rotor. The rotor then moves to the discharge position shown in Figure 1, at which time the piston moves outwardly to force the formed product 14 into a receiving mechanism which may be, for example, a wrapping machine indicated generally at 15. The receiving mechanism also forms no part of this invention but, to facilitate a general understanding of the operation, the receiving mechanism may comprise a conveyor 16 upon which enwrapments 17 have been applied and positioned to receive the product 14 as it is discharged from the former. If the enwrapment is in the form of a continuous web, it may be severed into desired lengths before or after receiving the product. Hinged arms 18, actuated by cam 19 and follower rollers 20, may be provided to support the enwrapment in an open position to facilitate receiving the product 14, after which the cam may actuate the arms to close the enwrapments against the adjacent side of the product. Subsequent wrapping operations are then performed to complete the enclosure of the product, all of which forms no part of this invention.

Coming now to the invention, a doctor blade 21, having a tapered and inwardly curved wiping edge 22, is supported with its wiping edge bearing against the periphery of the rotor. The blade structure is formed of a flexible material, such as rubber, and is carried upon a doctor support 23 which is formed with a reinforcing plate 24 that extends downwardly into the doctor and preferably terminates in an edge 25 of reduced thickness.

The body of the doctor blade is formed with a hollow chamber 26 which lies between the relatively stiff back side 27 and a relatively thin front side 28. The doctor support is mounted in its stationary operating position by any suitable mounting mechanism (not shown), and thus, as the rotor advances in a counter-clockwise direction as viewed in the drawings, the doctor blade wipes off the surface of the piston 13 after its outer surface has reached the position illustrated in Figure 1. In this wiping operation the side portion of the product that had been engaged by the piston moves over the lower portion of the front side 28 of the doctor blade.

In order that the separation of the product from the piston may be accomplished more effectively, the chamber 26 is subjected to a vacuum during the movement of the edge 22 over the piston. This vacuum is derived from a source indicated at 29 through a two-position valve 30 and pipe 31 and branched manifold 32 communicating with the chamber 26. During the period that suction exists in the chamber 26, the thin front side of the doctor assumes the position indicated by the dot-and-dash lines 28'.

The valve 30 is maintained normally in the position illustrated in Figure 1 by means of a spring 33, but is actuated to connect the pipe 31 with a source of pressure 34 by means of an arm 35 that is engaged by roller detents 36 carried upon the arms of a double crank 37. A valve 34' or other suitable mechanism is provided for controlling the pressure as desired to suit the condition of the plastic or other substance being deposited as hereinafter more fully explained. The crank 37 is driven in timed sequence with the rotor 11 by means of a shaft 38 and suitable drive mechanism not shown. This actuating mechanism is so constructed as to actuate the valve as soon as the edge 22 has moved across the face of the piston and the receiving means has been properly positioned to receive the product.

Figure 4:
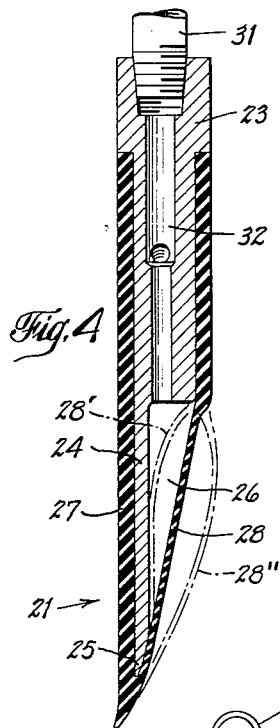
Figure 4 is an enlarged view in section, taken on the central vertical plane of Figure 3.
Figure 3:
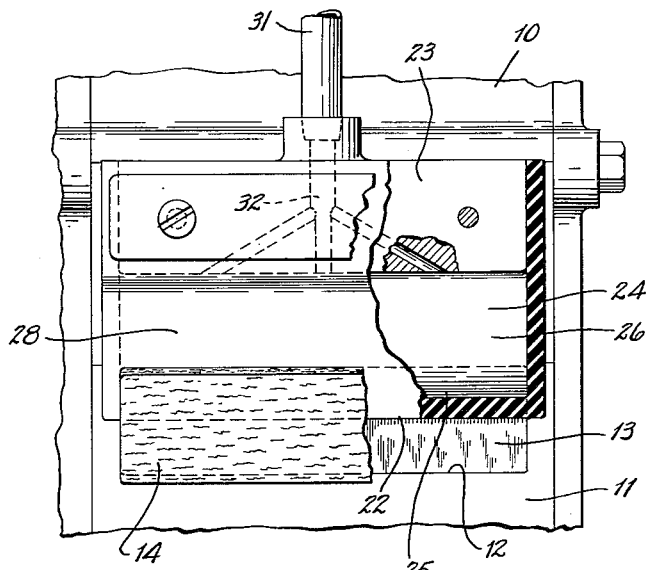
Figure 3 is a view in front elevation, partly broken away and in section, showing the structure of the doctor blade of Figures 1 and 2.

Upon application of pressure to the chamber 26 the front side 28 is distended as indicated at 28" in Figure 4, thus quickly forcing the product outwardly by a convex surface, the radius of curvature of which is rapidly decreasing. Because of the distention of the surface 28 during the aforesaid movement, this surface 28 readily leaves the surface of the product, and a clean break results.

As above stated, the pressure within the chamber 26 may be varied as desired by the mechanism 34' to suit the operation of the mechanism to varying conditions of the substance being deposited. If, for example, relatively soft butter is being deposited, the pressure within the chamber 26 should not be elevated beyond a pressure which will not have deleterious effects upon the desired shape of the product. If the product is firmer, the pressure, of course, can be increased appropriately.

Figure 5:
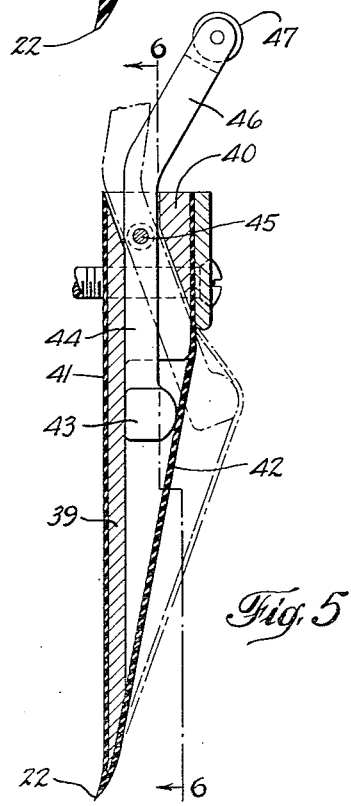
Figure 5 is a view similar to Figure 4, showing a modified form of doctor blade and actuating mechanism constructed in accordance with this invention.
Figure 6:
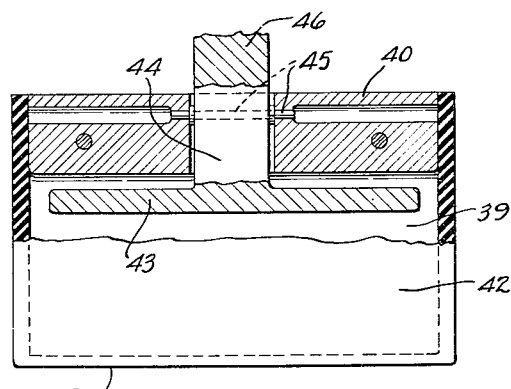
Figure 6 is a partial view in front elevation, partly broken away and in section, showing the mechanism of Figure 5.

In the form of the invention shown in Figures 5 and 6, the doctor mechanism is actuated mechanically instead of by fluid pressure. A doctor supporting plate 39 is mounted upon a body 40 over which a flexible doctor envelope 41 is applied. The front face or membrane 42 of the envelope overlies an elongated push rod 43 carried by an arm 44 pivoted in the body 40 at 45. The arm 44 is formed with a crank arm 46 provided with a roller 47 that is engaged by actuating mechanism driven in synchronism with the rotor as described in connection with the arm 37. As in the structure of Figures 1 to 4, the movement of the membrane 42 is varied to suit the condition of the product being deposited. To this end the actuating mechanism engaging the roller 47 is controlled to vary the extent of actuation of the push rod 43.

During movement of the edge 22 across the face of the piston, the front side 42 is in the position shown in solid lines in Figure 5. Upon traversing this surface, the actuating mechanism engages the roller 47 to move the arm 44 into the position illustrated in dot-and-dash lines in Figure 5, thus moving the push rod as shown to distend the flexible front side 42 into the dot-and-dash line position illustrated. Here, again, the push imparted to the product, together with the distending of the flexible side 42, causes a clean break from the product as it is taken by the receiving mechanism.

While this invention has been described with specific reference to the accompanying drawings, it is not to be limited save as defined in the appended claims.

I claim:

1. Mechanism for removing a product from a movable product forming element having a discharging means thereon, comprising a flexible stationary doctor blade engaging the discharging means to separate a product therefrom during movement thereof, and means to flex at least a portion of the doctor blade away from the discharging means after predetermined movement thereof.

2. Mechanism for removing a product from a movable product forming element having a discharging means thereon, comprising a flexible stationary doctor blade engaging the discharging means to separate a product therefrom during movement thereof, and means to subject the doctor blade to fluid pressure to flex a portion thereof away from the discharging means after predetermined movement thereof.

3. Mechanism for removing a product from a movable product forming element having a discharging means thereon, comprising a flexible stationary doctor blade engaging the discharging means to separate a product therefrom during movement thereof, and mechanical means to subject a portion of the doctor blade to flexing movement away from the discharging means after predetermined movement thereof.

4. Mechanism for removing a product from a movable product forming element having a discharging means thereon, comprising a doctor blade engaging the discharging means, a flexible element on the doctor blade, and means to distend the flexible element upon predetermined movement of the discharging means.

5. Mechanism for removing a product from a movable product forming element having a discharging means thereon, comprising a doctor blade engaging the discharging means, a flexible element on the doctor blade, and fluid means to distend the flexible element upon predetermined movement of the discharging means.

6. Mechanism for removing a product from a movable product forming element having a discharging means thereon, comprising a doctor blade engaging the discharging means, a flexible element on the doctor blade, and fluid means to contract the flexible element during a portion of the movement and distend the flexible element upon predetermined movement of the discharging means.

7. Mechanism for removing a product from a movable product forming element having a piston movable therein, comprising a doctor blade engaging the periphery of the product forming element, a flexible element on the side of the doctor blade away from the product forming element, and fluid pressure means to distend the flexible element after the doctor blade rides past the face of the piston.

8. Mechanism for removing a product from a movable product forming element having a piston movable therein, comprising a doctor blade engaging the periphery of the product forming element, a flexible element on the side of the doctor blade away from the product forming element, fluid pressure means to contract the flexible element during movement of the doctor blade across the face of the piston and to distend the flexible element after the doctor blade rides past the face of the piston.

9. Mechanism for removing a product from a movable product forming element having a discharging means therein movable therewith, comprising a doctor blade having an inner side engaging the product discharging means at a predetermined position of the product forming element and an outer side movable relative to said inner side, said discharging means being movable relative to said blade while said inner side is engaged therewith to separate a product from the discharging means, and means to move said outer side of the doctor blade relative to said inner side to disengage the product from the blade after predetermined movement of the discharging means relative to the blade.

References Cited in the file of this patent

UNITED STATES PATENTS

| 117,551 | Machen | Aug. 1, 1871 |
| 1,763,322 | Pointon et al. | June 10, 1930 |
| 2,178,406 | Rhodes | Oct. 31, 1939 |
| 2,352,220 | Overton | June 27, 1944 |
| 2,656,797 | Chambon | Oct. 27, 1953 |
| 2,719,494 | Spiess | Oct. 4, 1955 |

FOREIGN PATENTS

| 394,489 | Great Britain | June 29, 1933 |